United States Patent [19]

Toya

[11] 4,317,221
[45] Feb. 23, 1982

[54] MOBILE DATA RECEIVING SYSTEM

[75] Inventor: Mitsuo Toya, Fujisawa, Japan

[73] Assignee: Hitachi, Ltd., Tokyo, Japan

[21] Appl. No.: 114,689

[22] Filed: Jan. 23, 1980

[30] Foreign Application Priority Data

Jan. 24, 1979 [JP] Japan .................................. 54-6089

[51] Int. Cl.³ .............................................. H04B 1/38
[52] U.S. Cl. ....................................... 455/76; 455/89;
 375/111; 375/7; 179/2 E
[58] Field of Search ...................... 455/73, 75, 76, 77,
 455/85, 86, 87, 89, 165, 164, 183, 192, 257;
 179/2 E, 2 EA, 2 EB; 331/1 R; 375/120, 7, 9,
 8, 106, 94, 99, 119, 111

[56] References Cited

U.S. PATENT DOCUMENTS

| | | | |
|---|---|---|---|
| 4,019,153 | 4/1977 | Cox | 375/120 |
| 4,030,045 | 6/1977 | Clark | 375/120 |
| 4,031,330 | 6/1977 | Van Leeuwen | 179/2 EB |
| 4,038,494 | 7/1977 | Miller | 375/111 |
| 4,061,980 | 12/1977 | Sato | 455/183 |
| 4,070,626 | 1/1978 | Binder | 455/183 |
| 4,186,343 | 1/1980 | Kakigi | 455/76 |

FOREIGN PATENT DOCUMENTS

| | | | |
|---|---|---|---|
| 52-47315 | 4/1977 | Japan | 455/76 |
| 54-139317 | 10/1979 | Japan | 455/76 |

Primary Examiner—Robert L. Richardson
Assistant Examiner—Tommy P. Chin
Attorney, Agent, or Firm—Craig and Antonelli

[57] ABSTRACT

A mobile data receiving system for a mobile communication system is disclosed. A clock signal for a digital phase synchronization loop circuit used for receiving digital data such as a dial number is obtained by multiplying or dividing the frequency of the output signal of a highly-stable oscillator for generating a reference frequency for a frequency synthesizer. Also, noise which is generated by the operation of the digital phase synchronization loop circuit is prevented from deteriorating the performance of the transmitter-receiver by the use of a matching circuit located between the frequency multiplier or divider and the digital phase synchronization loop circuit.

6 Claims, 4 Drawing Figures

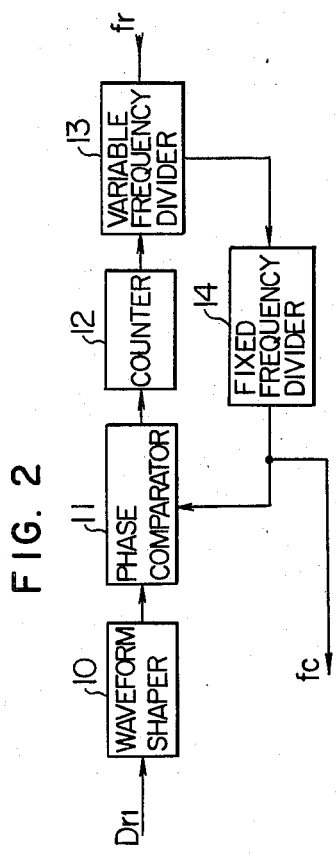
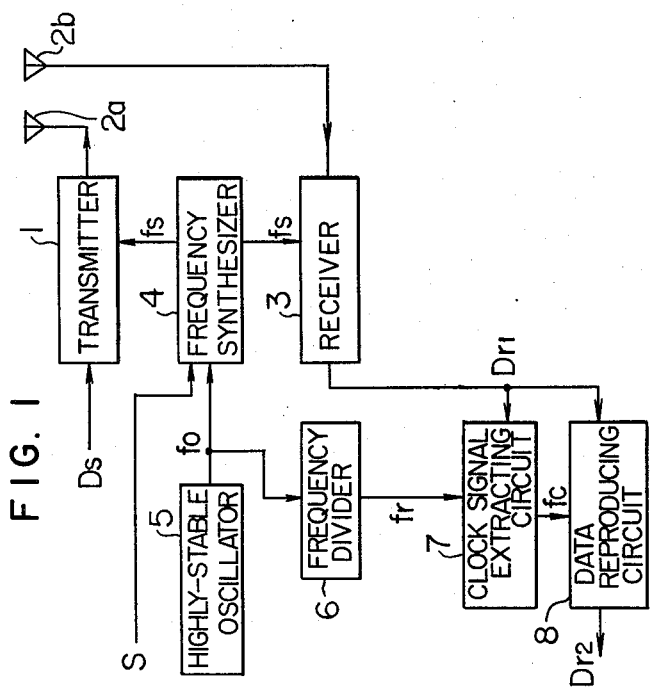
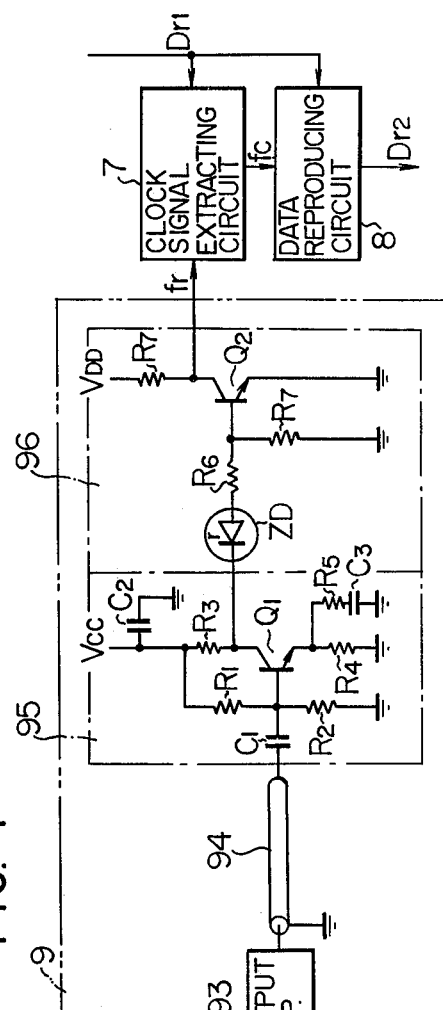
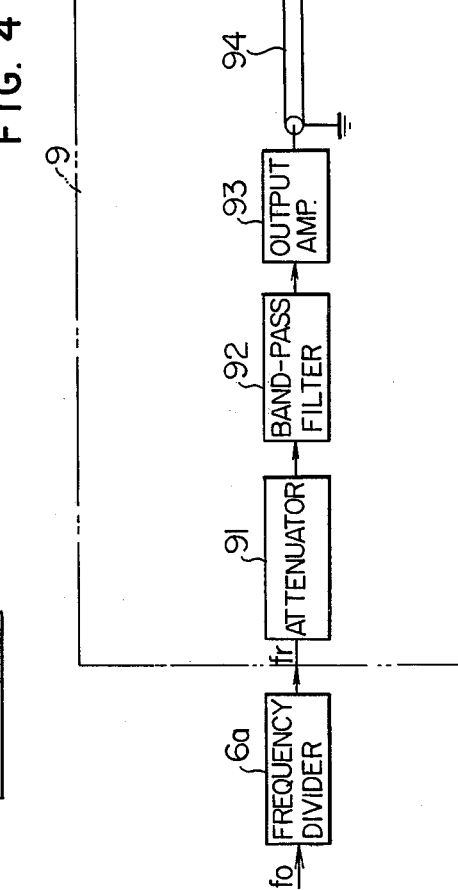

MOBILE DATA RECEIVING SYSTEM

BACKGROUND OF THE INVENTION

The techniques for handling data have recently made such rapid progress that they have almost come to be generally used in our daily lives. As an example, large-scale mobile telephone systems have either reached a practical stage or are on the drawing board.

In a mobile telephone network, a plurality of zones each having a radio station allotted with communication channels in the number of subscribers make up a control zone. Each control zone has a radio channel control station for controlling the radio stations within the particular control zone, thus establishing radio channels with mobile devices, i.e., telephones carried on automobiles. The mobile devices connected through these channels are connected to the public telephone network through an automobile telephone exchange coordinating a plurality of the radio channel control stations for connection between and charging on subscribers.

In the mobile communication system including automobile telephones mentioned above, a clock signal for data is required to be extracted for receiving digital data such as dial numbers. The prior art systems use a PLL circuit (phase locked loop) including a VCO (voltage controlled oscillator) or an LC tuning circuit in order to extract an LC clock signal. These circuits, however, are not suitable for conversion into integrated circuitry, so that a digital PLL circuit has recently come into use. The digital PLL circuit is capable of generating a frequency sufficiently high as compared with the clock frequency and requires a frequency source of high stability. In other words, in the mobile communication system for automobile telephones or the like, the transmitted signal is often displaced in time by such a phenomenon as reflection on a high-rise building. In order to extract the clock signal following up this displacement, a frequency source for generating a reference frequency which is highly stable for high frequencies is required for accurate receiving process.

SUMMARY OF THE INVENTION

An object of the present invention is to provide a reference frequency oscillation source for the data receiving clock signal extractor circuit used in a mobile communication system, which is high in stability and sufficiently high in frequency at the same time.

Another object of the present invention is to provide a high-performance data receiving system in which the output of the highly-stable oscillator for supplying a reference frequency for a frequency synthesizer for determining the radio frequency is frequency-divided as required, and the resulting signal is supplied as a reference frequency to the clock signal extracting digital PLL circuit for the data receiver.

According to the present invention, there is provided a mobile data receiving system in which the output of the highly-stable oscillator is frequency-divided as required, and the resulting signal is applied to a digital system or analog system circuit, while at the same time eliminating the adverse effect that one system may have on the other system at the time of connection thereto by use of a matching circuit of simple construction.

BRIEF DESCRIPTION OF THE DRAWINGS

FIG. 1 is a diagram showing a configuration of a mobile data receiving system according to an embodiment of the present invention.

FIG. 2 is a diagram showing a configuration of the detailed parts of a data-detecting clock signal extracting circuit.

FIG. 4 shows a specific construction of a matching circuit according to the present invention.

DESCRIPTION OF THE PREFERRED EMBODIMENTS

Figure 3:
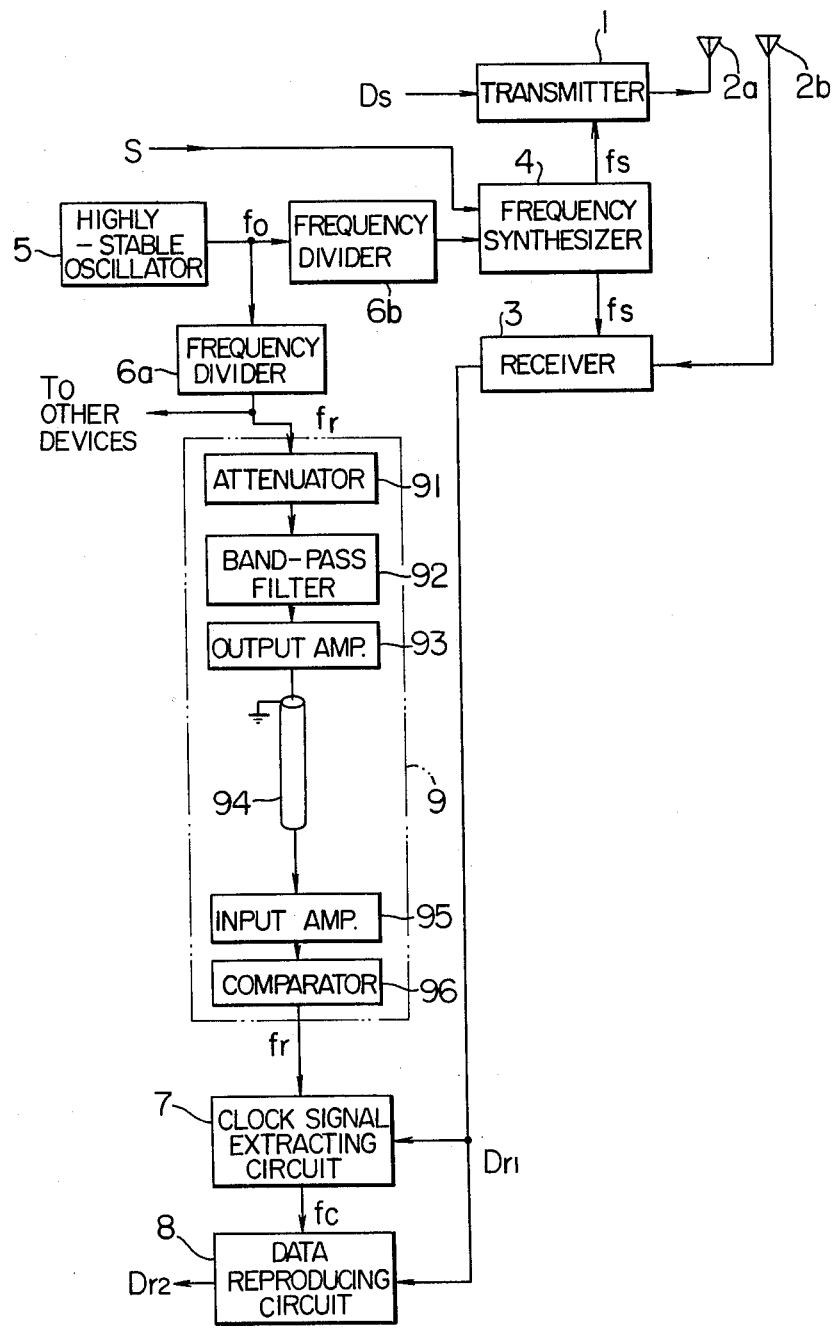
FIG. 3 is a diagram showing a construction of a data transceiving system according to another embodiment of the present invention.

An embodiment of the present invention will be described below with reference to the attached drawings. The parts of the radio station devices relating to the present invention are shown in FIG. 1. In this drawing, reference numeral 1 shows a transmitter, numeral 2a a transmitting antenna, numeral 2b a receiving antenna, numeral 3 a receiver, numeral 4 a frequency synthesizer, numeral 5 a highly-stable oscillator for producing a reference frequency for the frequency synthesizer, numeral 6 a frequency divider for frequency dividing the output frequency $f_0$ of the oscillator 5, numeral 7 a clock signal extracting circuit, and numeral 8 a data reproducing circuit.

In this configuration, the frequency synthesizer 4 has a circuit for producing different frequencies corresponding to a given channel by frequency-dividing the output frequency $f_0$ of the highly-stable oscillator 5 so that a specific frequency $f_s$ is determined in response to a channel-designating signal S. The transmitter 1 uses the frequency $f_s$ as a carrier wave and transmits from the transmitting antenna 2a a digital transmission data Ds such as a dial number in the form of, say, an FSK (Frequency Shift Keying) signal or phase modulated signal. In response to the frequency $f_s$, the receiver 3 is switched to a mode ready to receive only a certain frequency range different from the transmitted frequency. The output frequency $f_0$ of the highly-stable oscillator 5 is frequency-divided by the frequency divider 6, and the resultant frequency-divided signal $f_r$ is applied to the clock signal extracting circuit 7.

The configuration of the clock signal extracting circuit 7 is well known (PLL circuit) as shown in FIG. 2. Specifically, the output signal $Dr_1$ (signal corresponding to "1" or "0") of the receiver 3 is wave-shaped by a wave shaper 10 into a required digital waveform. The phase of this digital signal is compared with that of the extracted clock signal $f_c$ at a phase comparator 11. In the event that they are not in phase, digital integration is effected at a counter 12, the output of which is used to change the frequency-dividing ratio of a variable frequency divider 13 for dividing the frequency of the signal $f_r$ ($f_r > f_c$) from the frequency divider 6. A fixed frequency divider 14 is provided for the purpose of converting the output signal of the variable frequency divider 13 into a required frequency $f_c$. The data reproducing circuit 8 is for reproducing a data signal $Dr_2$ from the clock signal $f_c$ extracted at the circuit of FIG. 2 and the output signal $Dr_1$ of the receiver 3.

In a mobile telephone, the voice is of course also transmitted in addition to the data. The data is transmitted in such a short time as not to affect the human hearing by interrupting the voice. A voice signal making up the output signal of the receiver 3 actuates a voice generator not shown. In view of the difference thereof from the data signal in signal characteristics, however, the clock signal extracting circuit 7 or the data reproducing circuit 8 is not actuated.

As shown in FIG. 1, the output signal of the highly-stable oscillator for generating a reference frequency for the frequency synthesizer for switching a plurality of channels or the signal obtained by frequency division of the above-mentioned output signal of the highly-stable oscillator is applied as a reference signal for the data receiving digital phase synchronization loop circuit, thus producing a clock signal for the data. In this case, the operation of the digital phase synchronization circuit causes a noise, which intrudes into the transmitter and the receiver circuits through the reference frequency transmission line, thus deteriorating the transmission spurious response and the receiving S/N ratio. This occurs in the case where the transmitter-receiver is in proximity to the digital phase synchronization loop circuit and where the power supply for the digital phase synchronization loop circuit is provided separately from the power supply for the highly-stable oscillator and at the same time, the power supply for the digital phase synchronization loop circuit is low in stability as compared with the power supply for the highly-stable oscillator. FIG. 3 shows another embodiment of the present invention in which the deterioration of the transmission spurious response or the receiving S/N ratio is eliminated which otherwise might occur due to the above-mentioned condition.

In FIG. 3, like reference numerals as in FIG. 1 denote like component elements. Reference numerals 6a and 6b show frequency dividers, and numeral 9 a matching circuit inserted between the frequency divider 6a and the clock signal extracting circuit 7. The matching circuit 9 includes an attenuator 91 for attenuating the digital signal output $f_r$ frequency-divided by the frequency divider 6a, a band-pass filter 92 for converting the attenuated digital output signal into an analog signal, an output amplifier 93 for amplifying the output in analog form, a coaxial cable 94 for transmitting the analog output, an input amplifier 95 for amplifying the analog output thus transmitted, and a comparator 96 for converting the analog signal into a digital output signal again. Thus, the digital output signal $f_r$ is converted into an analog signal by the matching circuit 9 between the frequency divider 6a and the clock signal extracting circuit 7. In view of the fact that such a signal is transmitted at a low level, the noise generated in the clock signal extracting circuit including a digital PLL circuit fails to leak into the transmitter-receiver side by the matching circuit 9, thus preventing the deterioration of the transmission spurious response or the receiving S/N ratio.

A specific construction of the input amplifier 95 and the comparator 96 is shown in FIG. 4. Reference characters R1 to R8 show resistors, characters C1 to C3 capacitors, Q1 and Q2 transistors, and character ZD a level-shifting zener diode, thus constructing a very simple matching circuit.

In this system, the original oscillation frequency $f_0$ of 12 MHz of the highly-stable oscillator 5 is frequency-divided into a half by the frequency divider 6a and into 1/400 by the frequency divider 6b, so that a single highly-stable oscillator 5 supplies a synchronizing signal of 6 MHz to the clock signal extracting circuit 7 and a synchronizing signal of 30 KHz to the frequency synthesizer 4. The signal $f_r$ halved in frequency by the frequency divider 6a branches before or after the matching circuit and is further divided into 1/600 or 1/6,000,000 by a frequency divider not shown, thereby producing a synchronizing signal of 10 KHz or 1 Hz. Thus, if this signal is used as a time control signal or the like of a microcomputer for the control, the effect of the operation noise caused by the digital phase synchronization loop can be eliminated.

As described above, according to the present invention, the output signal of the highly-stable oscillator for determining the stability of the ratio carrier wave is used as a reference frequency for the digital PLL circuit, and the displacement of the extracted clock frequency is controlled by the accuracy of the reference frequency. Therefore, once the digital PLL circuit attains a synchronization, the displacement of the clock frequency is remarkably reduced, thus making possible a synchronizing circuit of high Q. There is no need to provide any highly-stable oscillator for the digital PLL circuit, thus leading to a high economical value. Although the above-mentioned embodiment involves a reference frequency for the digital PLL circuit obtained by frequency-dividing the reference frequency $f_0$, it may alternatively be used as it is as occasion demands.

I claim:

1. In a transmitter/receiver using a frequency synthesizer coupled to a transmitter and a receiver, a mobile data receiving system comprising a highly-stable oscillator coupled to said frequency synthesizer for producing a fundamental frequency for said frequency synthesizer, a frequency divider coupled to said highly stable oscillator for dividing an output frequency of said oscillator, a clock signal extracting circuit coupled to outputs of said receiver and said frequency divider for extracting a clock signal from the outputs of said frequency divider and receiver, and a data reproducing circuit coupled to outputs of said receiver and said clock signal extracting circuit for reproducing a clock signal obtained by said clock signal extracting circuit and a data signal obtained by said receiver to thereby reproduce digital data received by said receiver.

2. A mobile data receiving system according to claim 1, wherein said clock signal extracting circuit comprises a digital phase locked loop.

3. A mobile data receiving system according to claim 2, further comprising a matching circuit connected between said frequency divider and clock signal extracting circuit for removing noise generated by the digital phase locked loop forming said clock signal extracting circuit.

4. A mobile data receiving system according to claim 3, wherein there is further provided a second frequency divider between said highly-stable oscillator and frequency synthesizer.

5. A mobile data receiving system according to claim 3, wherein said matching circuit comprises an attenuator for reducing the output of said frequency divider by said matching circuit, a band-pass filter for converting said output into an analog form, a first amplifier for amplifying said analog output, a coaxial cable for transmitting said analog output, a second amplifier for amplifying said analog output transmitted by said coaxial cable, and a comparator for digitalizing the output of said second amplifier again.

6. In a transmitter/receiver using a frequency synthesizer coupled to a transmitter and a receiver, a mobile data receiving system comprising a highly-stable oscillator coupled to said frequency synthesizer for producing a fundamental frequency for said frequency synthesizer, means coupled to an output of said oscillator for reducing said oscillator output to a lower frequency, a clock signal extracting circuit coupled to outputs of said receiver and said frequency reducing means for extracting a clock signal from the outputs of said frequency reducing means and receiver, and a data reproducing circuit coupled to outputs of said receiver and said clock signal extracting circuit for reproducing a clock signal obtained by said clock signal extracting circuit and a data signal obtained by said receiver to thereby reproduce digital data received by said receiver.

* * * * *